May 15, 1928.

M. SCHENKEL

FREQUENCY CONVERTER OF ASYNCHRONOUS CONSTRUCTION

Filed July 23, 1925

1,669,577

INVENTOR
*Moritz Schenkel*
BY
*Wesley G. Carr*
ATTORNEY

Patented May 15, 1928.

1,669,577

UNITED STATES PATENT OFFICE.

MORITZ SCHENKEL, OF BERLIN-CHARLOTTENBURG, GERMANY, ASSIGNOR TO WESTINGHOUSE ELECTRIC & MANUFACTURING COMPANY, OF NEW YORK, N. Y., A CORPORATION.

FREQUENCY CONVERTER OF ASYNCHRONOUS CONSTRUCTION.

Application filed July 23, 1925, Serial No. 45,511, and in Germany December 3, 1924.

My invention relates to improvements in frequency converters of asynchronous construction.

For converting the frequency machines have been designed of the construction of asynchronous machines in which a frequency, say 50, is supplied to the stator and another frequency, preferably 42, 25 or 15 is taken from the rotor. Such machines run with a mechanical speed determined by the two frequencies and when power is withdrawn from one part and a corresponding amount of power is supplied to the other part they develop a mechanical torque, for which reason they must be mechanically coupled with a further machine which is in a position to take up this mechanical torque and to utilize it somewhere else. The mechanical power may for instance be converted into electrical power and be supplied to one of the networks. The nature of this second machine is immaterial and continuous current machines as well as asynchronous machines may be employed for the purpose the output of which can be usefully employed somewhere else. Besides the apparatus for taking up the mechanical torque of the main machine it is desirable to provide an apparatus for regulating the voltage as far as it is not already prescribed by the networks and the phase of the currents at both sides and under certain circumstances also the slip of the machine.

These three values may be regulated in a particularly simple manner according to my invention by employing as load or rear machine an asynchronous machine which is connected in cascade with the main machine and which is regulably excited from a three-phase exciter machine which is preferably separately excited.

Figure 1:
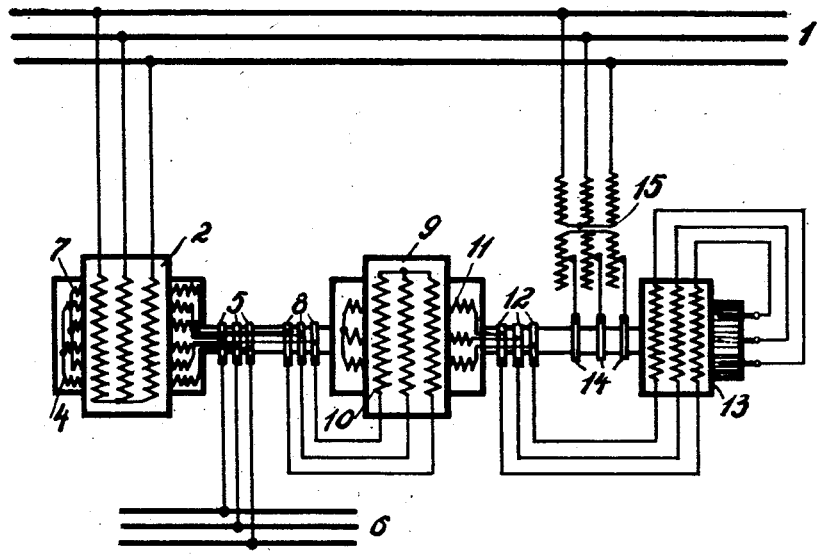
Figure 2:
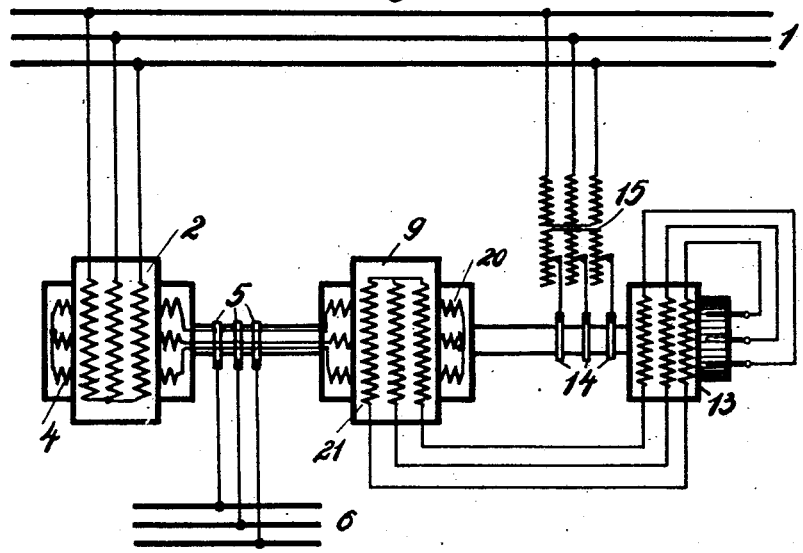

In the single sheet of drawings,

Fig. 1 is a diagram of the improved converter in which the stator of the rear machine is fed from the main machine and Fig. 2, a diagram of the improved converter in which the rotor of the rear machine is fed by the main machine.

Referring to Fig. 1, 1 is a three-phase network, for instance with the frequency 50, 2 the main machine with the primary winding 3 and the rotor winding 4 connected with the slip rings 5 and which feeds through the slip rings 5 the second network 6 in which another frequency is required. The rotor is also equipped with a second winding 7 which if required, may also be connected with the winding 4 and a second set of slip rings 8 which, if required, may also be connected with the slip ring set 5. The second set of slip rings may also be omitted altogether if, as illustrated in Fig. 2, the rotor of the rear machine is fed from the main machine and not the stator as in Fig. 1. The rear machine 9 is equipped with a winding 10 connected through the slip rings 8 with the winding 7 of the main machine and with a further winding 11 with which is connected through slip rings 12 a three-phase exciter machine 13 in known manner. This machine is illustrated as a compensated rotor-fed three-phase exciter machine, it may, however, equally well be a frequency converter and thus a non-compensated machine. The slip rings 14 of the exciter machine 13 are connected with the network 1 through the regulable transformer 15, but they may also be connected with the other network 6. By regulation on this transformer according to value and phase the value and the phase of the voltage of the network 6 may be regulated as desired or if this network already possesses another frequency through other machines the phase may be regulated. The speed of the frequency converter may also be brought to a certain value by means of this arrangement.

Various modifications and changes may be made without departing from the spirit and the scope of the invention, and I desire, therefore, that only such limitations shall be placed thereon as are imposed by the prior art.

I claim as my invention:

1. In a frequency converter, the combination of a three-phase network, a main machine, said main machine having a stator winding, means for connecting said stator winding with said network, said main machine also having a rotor winding and a set of slip rings connected with said rotor winding, a second network of a different frequency, means for connecting said second network with said slip rings, said main machine also having a second rotor winding, a second set of slip rings and a connection between said second winding and said second set of slip rings, a rear machine, said rear machine having a stator winding, a connection between said last-mentioned winding and said second set of slip rings, said rear machine also having a rotor winding, a set of slip rings connected with said last-mentioned rotor winding, a three-phase exciter machine connected with said last-mentioned slip rings, and a regulable transformer connected between said exciter machine and one of said networks.

2. In a frequency converter, the combination of a three-phase network, a second network of a different frequency, a main machine, said main machine having a stator winding, means for connecting said stator winding to one of said networks, said main machine also having a rotor winding and a set of slip rings connected with said rotor winding, means for connecting said slip rings to the other of said networks, a rear machine, said rear machine having a rotor winding and a stator winding, a polyphase exciter machine, said exciter machine having a stator winding and a commutator winding, an energy-transferring connection between the main machine and one of the windings of the rear machine, a connection between the exciter machine and the other winding of the rear machine, a regulable transformer, and means for connecting said transformer between said exciter machine and one of said networks.

In testimony whereof I affix my signature.

MORITZ SCHENKEL.